United States Patent [19]

Bennett et al.

[11] Patent Number: 5,354,799

[45] Date of Patent: Oct. 11, 1994

[54] LIMITED COALESCENCE PROCESS

[75] Inventors: James R. Bennett; Dennis E. Smith, both of Rochester, N.Y.

[73] Assignee: Eastman Kodak Company, Rochester, N.Y.

[21] Appl. No.: 977,224

[22] Filed: Nov. 16, 1992

[51] Int. Cl.$^5$ .................................................. C08F 2/16
[52] U.S. Cl. ................................. 524/458; 524/457; 528/934; 523/333; 523/339; 526/203
[58] Field of Search ............... 430/137; 523/333, 339; 524/457, 458; 528/934; 526/203

[56] References Cited

U.S. PATENT DOCUMENTS

| | | | |
|---|---|---|---|
| 2,932,629 | 4/1960 | Wiley | 260/91.5 |
| 2,934,530 | 4/1960 | Ballast et al. | 260/93.5 |
| 4,217,423 | 8/1980 | McClain | 525/62 |
| 4,623,604 | 11/1986 | Takagiwa et al. | 430/109 |
| 4,833,060 | 5/1989 | Nair et al. | 430/137 |
| 4,835,084 | 5/1989 | Nair et al. | 430/137 |
| 4,868,086 | 9/1989 | Ohtani et al. | 430/137 |
| 4,895,785 | 1/1990 | Tozimoto et al. | 430/137 |
| 4,965,131 | 10/1990 | Nair | 428/407 |
| 4,994,312 | 2/1991 | Maier et al. | 428/36.5 |
| 5,055,371 | 10/1991 | Lee et al. | 430/126 |

FOREIGN PATENT DOCUMENTS 61-258260 11/1986 Japan .

*Primary Examiner*—Marion E. McCamish
*Assistant Examiner*—Rosemary Ashton
*Attorney, Agent, or Firm*—Robert A. Gerlach

[57] ABSTRACT

A limited coalescence method of making polymer particles having an average particle size of 3 μm or less comprising dispersing the polymer particles in an organic liquid diluent after they are separated from the aqueous suspension medium in which they are prepared, to thereby eliminate or substantially avoid agglomeration between the polymer particles upon drying.

16 Claims, No Drawings

LIMITED COALESCENCE PROCESS

FIELD OF THE INVENTION

This invention relates to the preparation of polymer particles using the limited coalescence technique. More particularly, the invention concerns a limited coalescence method of making polymer particles of controlled small size in which the formation of particle agglomerates is substantially eliminated or avoided.

BACKGROUND

In many applications for polymer particles it is very important for such particles to be reasonably small and have a narrow size distribution. Such polymer particles are very useful matting agents, opacifying agents and spacers, particularly in photographic and electrostatographic materials such as toners and carriers. For example, U.S. Pat. Nos. 4,994,312 and 5,055,371 describe the use of small polymer particles to provide voids in polymeric shaped articles such as polyester sheets. Such sheets exhibit unique properties, including texture, opacity and whiteness which make them particularly suitable photographic supports and receiver sheets for electrostatic toner images.

The preparation of polymeric particles having controlled average particle size and narrow size distribution by a technique that has become known as "limited coalescence" is described in several patents including, for example, the aforementioned U.S. Pat. Nos. 4,994,312 and 5,055,371 and U.S. Pat. Nos. 2,932,629; 2,934,530; 4,833,060; 4,835,084 and 4,965,131.

In the limited coalescence method, as illustrated by the aforementioned patents, polymer particles are prepared by forming an aqueous suspension of polymer droplets in a medium containing small particles of a solid stabilizer to form droplets having a layer of such solid stabilizer particles on their surfaces (often referred to as an oil phase) in the aqueous medium (aqueous phase), forming solid polymer particles from the droplets and recovering the polymer particles. During the course of the process, coalescence of the oil (discontinuous) phase takes place to form larger size droplets. These droplets are limited in size by the presence of the particles of the solid stabilizer (often referred to as a suspension stabilizer or suspension stabilizing agent) in the aqueous (continuous) phase. The solid stabilizer particles limit coalescence from taking place by a mechanism that is generally believed to be a physical phenomenon of preventing, by physical separation, one droplet from wetting another and thereby joining together to form a larger droplet. Solid polymer particles that are covered with a layer of smaller stabilizer particles are formed from the droplets and recovered. For some applications of the polymer particles such as in some electrostatographic toners the smaller stabilizer particles are removed from the surfaces of the polymer particles, as illustrated by U.S. Pat. Nos. 4,833,060 and 4,835,084. In other applications such as their use in photographic supports or in electrostatographic receivers, the presence of such stabilizer particles on the surfaces of the polymer particles is desirable. See, for example, U.S. Pat. Nos. 4,994,312 and 5,055,371.

A problem that can occur in a limited coalescence method of making polymer particles of controlled size and size distribution, and which is particularly troublesome with polymer particles having an average particle size of less than 5 $\mu$m, is that such particles tend to agglomerate and form clumps of particles. The formation of such agglomerates defeats the purpose of utilizing the limited coalescence method in the first place to achieve small particles and a narrow particle size distribution, In conventional prior art limited coalescence methods, it is accepted practice to separate the polymer particles from the aqueous reaction medium in which they are prepared, for example, by collection on a fine mesh screen or filter, and then wash the separated particles, i.e., the filter cake, with water prior to drying. Suitable washing techniques include rinsing or spraying the filter cake with water, which is commonly known as displacement washing, or dispersing the filter cake in water, which is commonly known as reslurry washing. Although such washing methods are usually acceptable for larger polymer particles, for example those having an average particle size of 5 $\mu$m or more, for example, 5, 10 or 25 $\mu$m, undesirable particle agglomerates form when these methods are used with smaller size polymer particles such as those having an average particle size of 5 $\mu$m or less. In earlier work conducted prior to this invention, we found that using methanol as the wash liquid to displacement wash polymer particles prepared in a limited coalescence method improved particle separation, provided that polymer particles had an average particle size of 4 $\mu$m or more. This improved method has been used successfully by us for several years to provide free-flowing polymer particles having an average particle size of 4 $\mu$m or more. Unfortunately, even this improved method is not effective to avoid the formation of polymer particle agglomerates when the average particle size of the polymer particles is 3 $\mu$m or less. Such small particle agglomerates require further processing such as milling and classification procedures that add to processing times and cost. Polymer particles having an average particle size of 3 $\mu$m or less are useful for all of the purposes discussed previously herein, but they are particularly useful in photographic supports of the type described in U.S. Pat. No. 4,994,312 where they provide a relatively smooth surface which improves handling characteristics of the supports.

The problem of this invention is to provide a method of making polymer particles having an average particle size of 3 $\mu$m or less using a limited coalescence method which avoids or substantially eliminates the formation of polymer particle agglomerates or clumps upon drying.

SUMMARY OF THE INVENTION

In accordance with this invention, clumping or clustering of polymeric particles that are prepared in a limited coalescence method and have a particle size up to 3 $\mu$m is avoided by reslurry washing the polymeric particles with an organic liquid diluent. Accordingly, this invention provides an improvement in a limited coalescence method of making polymer particles of controlled size by forming an aqueous suspension of polymer droplets having a layer of particulate suspension stabilizer on their surfaces which limits coalescence between droplets, forming solid polymer particles from the droplets and removing the polymer particles from the aqueous suspension medium. Such improvement comprises (a) controlling the average particle size of the polymer particles to not more than 3 $\mu$m, (b) dispersing the polymer particles in an organic liquid diluent that is miscible with the aqueous suspension medium and is a nonsolvent for the polymer particles, and (c) separating the polymer particles from the diluent, to thereby substantially avoid agglomeration between the polymer particles upon drying.

A significant advantage of this invention is that it provides a convenient and cost effective means of modifying conventional limited coalescence methods for making polymer particles having an average particle size of 3 μm or less which avoids or substantially eliminates the formation of particle agglomerates or clumps. Thus, controlling particle size of the polymer particles and reslurry washing with the organic liquid solvent can be achieved conveniently without costly equipment changes.

Another advantage of this invention is that the use of potassium dichromate as a polymerization inhibitor in the aqueous suspension medium in the method of this invention, provides polymer particles having a narrower average particle size distribution than is obtained in the absence of the potassium dichromate or with a different polymerization inhibitor.

DETAILED DESCRIPTION OF THE INVENTION

As previously indicated herein, this invention is an improvement in the limited coalescence method for preparing polymer particles. The limited coalescence method is well known to those skilled in the art and process parameters, except for the use of the liquid organic diluent according to the practice of this invention, are described in a number of patents, including U.S. Pat. No. 2,932,629, issued Apr. 12, 1960; U.S. Pat. No. 2,934,530, issued Apr. 26, 1960; U.S. Pat. No. 4,833,060, issued May 23, 1989; U.S. Pat. No. 4,835,084, issued May 30, 1989; U.S. Pat. No. 4,965,131, issued Oct. 23, 1990; U.S. Pat. No. 4,994,312, issued Feb. 19, 1992; and U.S. Pat. No. 5,055,371, issued Oct. 8, 1991, the disclosures of which are hereby incorporated herein by reference.

The limited coalescence method of this invention can differ in the technique used to form the suspension of polymer droplets, as discussed in detail, for example, in the aforementioned U.S. Pat. Nos. 4,835,084 and 4,965,131. The method employed in accordance with this invention encompasses the technique wherein monomer or monomers containing desired addenda are added to an aqueous suspension medium containing a particulate suspension stabilizer and, in certain cases, a promoter which drives the particulate suspension stabilizer to the surface of the monomer droplets. This mixture is agitated under heavy shearing forces to reduce the size of the droplets. During this time an equilibrium is reached and the size of the droplets is stabilized by the action of the suspension stabilizer coating the surfaces of the droplets. After polymerization is complete there is obtained a suspension of polymer particles in an aqueous phase having a layer of solid particulate suspension stabilizer on the surfaces of the polymer particles. The polymer particles are then removed from the aqueous suspension medium and then dispersed in the organic liquid diluent in accordance with this invention.

A second technique which is also encompassed by the limited coalescence method of this invention involves forming the polymer droplets by dissolving a polymer in a solvent therefor which solvent is immiscible with water thereby forming droplets in the continuous aqueous phase when the system is subjected to high shear agitation. The polymer particles in the aqueous phase are coated with the particulate suspension stabilizer in the same manner as described in the previous paragraph. The solvent is then driven off and the polymer particles are subjected to reslurry washing according to the practice of this invention.

In a limited coalescence method wherein polymerization takes place within the discontinuous droplets, any suitable polymerizable monomer may be used in accordance with this invention. Typical polymerizable monomers are those that form linear addition polymers, typically by vinyl addition polymerization. Examples of suitable monomers are styrene, p-chlorostyrene; vinyl naphthalene; ethylenically unsaturated mono-olefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; esters of alphamethylene aliphatic monocarboxylic acids such as methyl acrylate, ethyl acrylate, N-butylacrylater isobutyl acrylate, dodecyl acrylate, n-octyl acrylate, 2-choroethyl acrylate, phenyl acrylate, methyl-alphachloroacrylate, methyl methacrylate, ethyl methacrylate and butyl methacrylate; acrylonitrile, methacrylonitrile, acrylamide, vinyl ethers such as vinyl methyl ether, vinyl isobutyl ether and vinyl ethyl ether; vinyl ketones such as vinyl methylketone, vinyl hexyl ketone and methyl isopropyl ketone; vinylidene halides such as vinylidene chloride and vinylidene chlorofluoride; and N-vinyl compounds such as N-vinyl pyrrole, N-vinyl carbazole, N-vinyl indole and N-vinyl pyrrolidene; and mixtures thereof. Styrene or mixtures of styrene with n-butylacrylate have been found to be particularly suitable monomers for use in the method of this invention.

If desired, a suitable crosslinking monomer may be used in forming polymer droplets by polymerizing a monomer or monomers within droplets in accordance with this invention to thereby modify the polymeric particle and produce particularly desired properties. Typical crosslinking monomers are aromatic divinyl compounds such as divinylbenzene, divinylnaphthalene or derivatives thereof; diethylene carboxylate esters and amides such as diethylene glycol methacrylate, diethylene glycol methacrylamide, diethylene glycol acrylate, and other divinyl compounds such as divinyl sulfide or divinyl sulfone compounds.

Any catalyst or initiator which is soluble in the particular monomer or monomers polymerized within the droplets may be utilized in the process of the invention. Typical initiators for polymerization are the peroxide and azo initiators. Among those found suitable for use in the process of the invention are 2,2' azobis (2,4-dimethyl valeronitrile), lauroyl peroxide, benzoyl peroxide and the like which result in complete polymerization without leaving detrimental residual materials. Chain transfer agents may also be added to the monomer to control the properties of the polymer particles formed.

When a polymer or mixture of polymers is used as the starting material to form the polymer droplets, any suitable polymer may be used such as, for example, olefin homopolymers and copolymers, such as polyethylene, polypropylene, polyisobutylene, and polyisopentylene; polyfluoroolefins, such as polytetrafluoroethylene and polyhexamethylene adipamide; polyhexamethylene sebacamide, and polycaprolactam; acrylic resins, such as polymethyl-methacrylate, polyacrylonitrile, polymethylacrylate, polyethylmethacrylate, and styrene-methylmethacrylate copolymers and ethylene-methyl acrylate copolymers, ethylene-ethyl methacrylate copolymers, polystyrene and copolymers thereof with unsaturated monomers mentioned previously, cellulose derivatives, such as cellulose acetate, cellulose acetate butyrate, cellulose propionate, cellulose acetate propionate, and ethyl cellulose; polyesters, such as polycarbonates; polyvinyl resins, such as polyvinyl chloride, copolymers of vinyl chloride and vinyl acetate, and polyvinyl butyral, polyvinyl alcohol, polyvinyl acetal, ethylene-vinyl acetate copolymers, ethylene-vinyl alcohol copolymers, and ethylene-allyl copolymers, such as ethylene-allyl alcohol copolymers, ethylene-allyl acetone copolymers, ethylene-allyl benzene copolymers, ethylene-allyl ether copolymers, and ethylene-acrylic copolymers; and polyoxymethylene, polycondensation polymers such as polyesters, polyurethanes, polyamides and polycarbonates.

The diameter of the polymer droplets, and hence the diameter of the polymer particles (average particle size), can be varied predictably in limited coalescence methods. This is accomplished by deliberate variation of the composition of the aqueous liquid dispersion to control the average particle size of the polymer particles which, in accordance with this invention, is not more than 3 $\mu$m, typically 1 to 2 $\mu$m. The average particle size of the polymer particles in a limited coalescence process is determined principally by the composition of the aqueous dispersion and the mechanical conditions, such as the degree of shear and agitation, as well known to those skilled in the art. Furthermore, by employing the same compositions and mechanical conditions, operations can be repeated or the scale of operation can be changed and substantially the same results can be obtained as regards the average particle size of the polymer particles prepared.

The particulate suspension stabilizers employed in the practice of this invention include any of the solid colloidal materials that are known in prior art to be suitable for this purpose. Such stabilizers provide a third phase because they are insoluble in both the aqueous suspension medium and in the suspended droplets. They are also nondispersible in the droplets, but wettable by the droplets. They are more hydrophilic than oleophilic, and more hydrophilic than the droplets, so that they can remain at the interface of the aqueous suspension medium and the suspended droplets. Such stabilizers can be inorganic materials such as metal salts or hydroxides or oxides or clays or can be organic materials such as starches, sulfonated crosslinked organic homopolymers and resinous polymers, as described, for example, in U.S. Pat. No. 2,932,629. Silica, as described in U.S. Pat. No. 4,833,060, and copolymers such as copoly(styrene-2-hydroxyethyl methacrylate-methyacrylic acid-ethylene glycol dimethacrylate), as described in U.S. Pat. No. 4,965,131, are examples of particularly desirable particulate suspension stabilizers that can be used in the practice of this invention. As described in U.S. Pat. No. 4,965,131, certain applications such as toner and carrier materials in electrostatography, require that solid particulate suspension stabilizer particles such as silica be removed from the polymer particles. Such removal is necessary because they interfere with the triboelectric relationship between carrier particles and toner particles employed in developers in electrostatographic copying devices. In other applications, as described in U.S. Pat. No. 4,994,312, where the polymer particles are used to form microvoids in a polymeric matrix, the presence of a particulate suspension stabilizer such as silica on the surface of the polymer particles may be advantageous since it can provide a lubricating effect in forming such microvoids.

It is known that some suspension stabilizers, for example silica, are used with promoters that are present in the aqueous suspension medium and drive the particulate suspension stabilizer to the interface between the aqueous layer and the polymer droplets formed during vigorous stirring of the system. When a promoter is used in the method of this invention, any suitable promoter that is water soluble and affects the hydrophilic/hydrophobic balance of the particulate suspension stabilizer in the aqueous suspension medium may be employed to drive the solid particulate suspension stabilizer particles to the polymer/solvent droplet/aqueous suspension medium interface. Suitable materials include, for example, sulfonated polystyrenes, alginates, carboxymethyl cellulose, tetramethyl ammonium hydroxide or chloride, diethylaminoethylmethacrylate, water-soluble complex resinous amine condensation products such as the water soluble condensation products of diethanol amine and adipic acid, a particularly suitable one of this type is poly(adipic acid-co-methylaminoethanol), water-soluble condensation products of ethylene oxide, urea and formaldehyde and polyethyleneimine. Also effective as promoters are gelatin, glue, casein, albumin and gluten. Nonionic materials such as methoxy cellulose can be used. Generally, the promoter is used in amounts of at least 0.2, often about 1 to 1.2 parts per 100 parts of aqueous solution.

Particles having an average particle size of not more than 3 $\mu$m, often 0.5 to 3 $\mu$m and typically 1–2 $\mu$m are prepared in accordance with this invention. The term "average particle size," or the term "average size," in reference to the term "particles," is the mean volume weighted diameter as measured by conventional diameter measuring devices, such as a Coulter Multisizer, sold by Coulter, Inc. Mean volume weighted diameter is the sum of the mass of each particle times the diameter of a spherical particle of equal mass and density, divided by total particle mass.

It is sometimes desirable to add to the aqueous suspension a few parts per million of a water-soluble, oil-insoluble polymerization inhibitor which is effective to prevent the polymerization of monomer molecules that may diffuse into the aqueous suspension medium when the polymer droplets are prepared by polymerization. Suitable inhibitors are well known in the prior art as exemplified by U.S. Pat. Nos. 2,932,629 and 4,994,312. Suitable polymerization inhibitors include, for example, potassium dichromate and cupric sulfate pentahydrate. As previously indicated herein, the use of potassium dichromate in the process of this invention provides an added advantage in that its use provides polymer particles having a narrower particle size distribution. Such narrow particle size distribution can be verified using conventional methods and equipment, for example particle size distribution can be analyzed using a Coulter Counter Multisizer, sold by Coulter Inc., by the method described in U.S. Pat. No. 4,965,131, referred to previously herein, at column 7, lines 60–63 or by the method described in "Polymer Technology Series," 3rd Edition 1989, Particle Size Measurement by T. Allen, page 135.

In practicing this invention, polymer particles having an average particle size of not more than 3 $\mu$m are dispersed in an organic liquid diluent. The nature of the diluent is subject to considerable variation, although it is liquid under the conditions of treatment and is inert, i.e. it does not enter into a chemical reaction with the polymer particles. Such diluent is miscible with the aqueous suspension medium and is a nonsolvent for the polymer particles. The diluent functions as a reslurry wash liquid for the polymer particles. The polymer particles can be dispersed in a diluent or mixture of diluents immediately after separation from the aqueous suspension, although they are typically subjected to one or more water washes prior to such dispersion. Suitable organic liquid diluents are typically low molecular weight materials, generally having molecular weights that do not exceed about 100, often less than 50, and frequently in the range of about 30 to 50. Examples of such materials are alkanols, often containing no more than 8 carbon atoms, typically 1 to 4 carbon atoms, ketones containing up to 8 carbon atoms, alkanes such as pentane, hexane, heptane and cyclohexane and aromatic hydrocarbons such benzene, toluene and xylene. Other known inert liquid hydrocarbons that function as reslurry wash liquids and which can be used in this invention include octane and isooctane.

The following examples are included to further illustrate the invention.

Example 1

To illustrate this invention, polystyrene particles having an average particle size of about 2 μm were prepared as follows:

21.14 gm of a 30 percent aqueous composition of benzoyl peroxide free radical initiator sold under the trade designation Lucidol 70 by the Pennwalt Corp. was dissolved in 1174 gm of styrene to provide a monomer solution.

An aqueous suspension was prepared from 1660 gm of water, 1.7 gm of potassium dichromate, 18.4 gm of poly(adipic acid-co-diethanolamine) and 293.2 gm of a 50 percent aqueous dispersion of silica particles having a size of 20–25 nm sold under the tradename Ludox TM by the dupont Company.

The monomer solution was added to the aqueous suspension and the resulting suspension was subjected to shear using a Gaulin Mouton homogenizer (sold by APV Gaulin, Inc.). This suspension was stirred at 65° C. in a 5 l. flask for 16 hours. The temperature was then increased to 85° C. for 4 hours to harden the polystyrene particles and reduce residual monomer content. The polystyrene particles had an average particle size of about 2 μm. The suspension was cooled and poured through a standard 250 μm wire screen (60 mesh) to remove grossly oversized particles and agglomerates. The resulting suspension was poured into a pressure filter and filtered at 350 kPa to form a damp filter cake.

Approximately 25 percent, by volume, of the damp cake was put in a tray for drying. (Sample 1). The remaining 75 percent, by volume, of the damp cake was slurried in water and filtered at a pressure of 350 kPa. (Sample 2).

Approximately 30 percent, by volume, of this damp cake was set aside for drying and the remaining damp cake was reslurried in water and filtered at a pressure of 350 kPa. (Sample 3). Approximately 50 percent, by volume, of this damp cake was set aside for drying and the remaining damp cake slurried in methanol and filtered at a pressure of 350 kPa. (Sample 4). This technique yielded the samples (Samples 1–4) which were each dried at 70° C. in an air oven. The treatments of the samples are summarized as follows:

Sample 1 - mother liquors removed with no water wash
Sample 2 - 1 water wash
Sample 3 - 2 water washes
Sample 4 - 2 water washes, 1 methanol wash 160 grams of each sample was sieved on a standard 150 μm wire screen (100 mesh) for 3 minutes and the weight of the polystyrene particles retained on the screen was recorded. The greater the weight of particles retained, the greater the agglomeration of particles. The results are set forth in the following Table 1.

TABLE 1

| Sample | Particles Retained on Screen (gm) | Percent, by Weight, Particles Retained On Screen |
| --- | --- | --- |
| 1 | 150.6 | 94 |
| 2 | 133.4 | 83 |
| 3 | 119 | 74 |
| 4 | 61.4 | 40 |

As shown by the values reported in the above Table 1, the process of this invention significantly reduces particle agglomeration. Thus, after sieving for only three minutes, 60 percent, by weight, of the methanol washed Sample 4 passed through the sieve. This sample comminuted readily into a free-flowing powder. In contrast, only 6, 17 and 26 percent, by weight, of the Unwashed sample (Sample 1) or water washed samples (Samples 2 and 3) passed through the sieve. Furthermore, each of Samples 1, 2 and 3 on the screen were in the form of hard lumps of agglomerated polymer particles which were extremely difficult to break up.

Example 2

The procedure of Example 1 was repeated with a mixture of styrene and divinylbenzene to provide particles of polystyrene crosslinked with divinylbenzene having an average particle size of about 2 μm.

The monomer solution contained 4100 gm of styrene, 1770 gm of divinylbenzene and 105.7 gm of the benzoyl peroxide composition.

The aqueous suspension contained 8300 gm of water, 8.46 gm of potassium dichromate, 92 gm of poly(adipic acid-co-diethanolamine) and 1466 gm of the dispersion of silica particles.

Four 400 gm samples were prepared and washed using the technique described in Example 1 except that the time of sieving was increased to 25 minutes. The results are reported in the following Table 2.

TABLE 2

| Sample | Particles Retained on Screen (gm) | Percent, by Weight, Particles Retained On Screen |
| --- | --- | --- |
| 1 | 90 | 22 |
| 2 | 20 | 5 |
| 3 | 10 | 2.5 |
| 4 | 0 | 0 |

As shown by the values reported in the above Table 2, after sieving for 25 minutes all of the methanol washed sample passed through the screen. In contrast, each of the other samples contained hard agglomerates which would not pass through the screen.

When the procedure of this Example 2 is repeated, but without using potassium dichromate in the aqueous suspension, the resulting crosslinked polystyrene particles exhibit a much wider particle size distribution. The narrowing of particle size distribution which results when potassium dichromate is used in the process of this invention has not been observed when other polymerization inhibitors such as cupric sulfate pentahydrate are so used.

Example 3

The procedure of Example 1 was repeated with a mixture of methylmethacrylate and ethylene glycol dimethacrylate to provide particles of polymethylmethacrylate crosslinked with ethylene glycol dimethacrylate having an average particle size of about 2 μm.

The monomer solution contained 1115.3 gm of methylmethacrylate, 58.7 gm of ethylene glycol dimethacrylate and 21.14 gm of the benzoyl peroxide composition.

The aqueous suspension contained 1660 gm of water, 1.7 gm of potassium dichromate 18.4 gm of poly(adipic acid-co-diethanolamine) and 293.2 gm of the dispersion of silica particles.

Four 140 gm samples were prepared and washed using the technique described in Example 1. The results are reported in the following Table 3.

TABLE 3

| Sample | Particles Retained on Screen (gm) | Percent, by Weight, Particles Retained On Screen |
| --- | --- | --- |
| 1 | 135.8 | 97 |
| 2 | 134 | 96 |
| 3 | 122 | 87 |
| 4 | 108.7 | 78 |

A comparison between the weight of particles retained on the screen from Samples 1–3 and the weight of particles retained from Sample 4 illustrates that reslurry wash with the organic liquid diluent according to this invention significantly decreases particle agglomeration.

Example 4

The procedure of Example 2 was repeated except that tetrahydrofuran (THF), isopropyl alcohol (IA), acetone (A) and methanol (M) were each used as the organic diluent in the reslurry wash for the particles of polystyrene crosslinked with divinylbenzene. The sieving time was 1 minute. The results obtained with 15 gm samples after two water washes and treatment with the aforementioned diluents are set forth in the following Table 4.

TABLE 4

| Organic Diluent | Particles Retained on Screen (gm) | Percent, by Weight, Particles Retained On Screen |
| --- | --- | --- |
| None | 10.3 | 69 |
| THF | 8.8 | 59 |
| IA | 7 | 47 |
| A | 5.7 | 38 |
| M | 5.7 | 38 |

The invention has been described in detail with particular reference to preferred embodiments thereof, but it will be understood that variations and modifications can be effected within the spirit and scope of the invention.

We claim:

1. In a limited coalescence method of making polymer particles of controlled size, which method comprises forming an aqueous suspension of polymer droplets, such droplets being immiscible with the aqueous suspension medium and having a layer of particulate suspension stabilizer on their surfaces which limits coalescence between droplets, forming solid particles from the droplets and separating the polymer particles having a layer of particulate suspension stabilizer on their surfaces from the aqueous suspension medium, the improvement comprising (a) controlling the coalescence between the droplets to provide polymer particles having an average particle size of not more than 3 μm, (b) reslurry washing the separated polymer particles by dispersing them in an organic liquid diluent that is miscible with the aqueous suspension medium and is a nonsolvent for the polymer particles, and (c) separating the polymer particles from the diluent to thereby substantially avoid agglomeration between the polymer particles upon drying.

2. The method of claim 1, wherein the average particle size of the polymer particles is in the range of about 1 to 3 μm.

3. The method of claim 1, wherein the average particle size of the polymer particles is in the range of about 1 to 2 μm.

4. The method of claim 1, wherein the diluent has a molecular weight up to about 100.

5. The method of claim 1, wherein the diluent has a molecular weight less than 50.

6. The method of claim 4, wherein the diluent is an alkanol containing up to 4 carbon atoms.

7. The method of claim 6, wherein the alkanol is methanol.

8. The method of claim 1, wherein the particulate suspension stabilizer is an inorganic particulate stabilizer and the aqueous suspension medium comprises a promotor.

9. The method of claim 8, wherein the stabilizer is silica.

10. The method of claim 1, wherein the droplets are formed by polymerization of monomers within the droplets.

11. The method of claim 10, wherein the polymer formed within the droplets is a crosslinked polymer.

12. The method of claim 11, wherein the crosslinked polymer is a styrene polymer.

13. The method of claim 12, wherein the styrene polymer is crosslinked with divinylbenzene.

14. The method of claim 10, wherein potassium dichromate is present in the aqueous suspension as a polymerization inhibitor.

15. The method of claim 1, wherein the polymer droplets comprise polycondensation polymer.

16. The method of claim 15, wherein the polycondensation polymer is a polyester.

* * * * *